(12) United States Patent
Tomizawa et al.

(10) Patent No.: US 9,455,610 B2
(45) Date of Patent: Sep. 27, 2016

(54) MOTOR DRIVE APPARATUS

(71) Applicant: DENSO CORPORATION, Kariya, Aichi-pref. (JP)

(72) Inventors: Hiroki Tomizawa, Kariya (JP); Jirou Hayashi, Ama (JP); Hiroshi Imai, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 680 days.

(21) Appl. No.: 13/834,234

(22) Filed: Mar. 15, 2013

(65) Prior Publication Data

US 2013/0257232 A1    Oct. 3, 2013

(30) Foreign Application Priority Data

Mar. 29, 2012 (JP) .................................. 2012-76187

(51) Int. Cl.
*H02K 11/00* (2016.01)
*H02K 29/08* (2006.01)

(52) U.S. Cl.
CPC ........... *H02K 11/0073* (2013.01); *H02K 11/33* (2016.01); *H02K 29/08* (2013.01)

(58) Field of Classification Search
CPC ........... H02K 11/001; H02K 11/0015; H02K 11/0068; H02K 11/0071; H02K 11/21; H02K 11/215; H02K 11/225; H02K 11/30; H02K 11/33; H02K 29/08
USPC .............................................. 310/38 B, 68 B
See application file for complete search history.

(56) References Cited

U.S. PATENT DOCUMENTS

| 4,998,865 A | * | 3/1991 | Nakanishi | ............ F02M 37/08 310/51 |
| 2005/0079069 A1 | * | 4/2005 | Fujita | ........................ A47L 5/22 417/366 |
| 2011/0012457 A1 | * | 1/2011 | Ikitake | .................. H05K 7/142 310/91 |
| 2011/0018374 A1 | | 1/2011 | Yamasaki et al. | |
| 2011/0254393 A1 | * | 10/2011 | Yamasaki | ............. H02K 11/33 310/64 |
| 2011/0254411 A1 | * | 10/2011 | Minato | ................. H02M 7/003 310/68 C |
| 2012/0098361 A1 | * | 4/2012 | Yamasaki | ............ B62D 5/0406 310/52 |
| 2012/0098365 A1 | | 4/2012 | Yamasaki et al. | |
| 2012/0098366 A1 | | 4/2012 | Yamasaki et al. | |
| 2012/0104886 A1 | | 5/2012 | Yamasaki et al. | |

FOREIGN PATENT DOCUMENTS

| JP | 2008175090 A | * 7/2008 | |
| JP | 2010-104212 | 5/2010 | |
| WO | WO 2010150529 A1 | * 12/2010 | ........... B62D 5/0406 |

OTHER PUBLICATIONS

Otawara et al., Machine Translation of JP2010104212, May 2010.*
(Continued)

*Primary Examiner* — Quyen Leung
*Assistant Examiner* — Eric Johnson
(74) *Attorney, Agent, or Firm* — Nixon & Vanderhye PC (57) ABSTRACT

A motor drive apparatus includes a rear end frame between a motor case and a control unit case. A shaft of a motor unit is supported rotatably by a bearing fixed to the rear end frame. A first socket-spigot fitting surface formed on the rear end frame is fitted with a second socket-spigot fitting surface formed on a heat sink. A rotation angle sensor mounted on a control unit substrate attached to the heat sink is provided on the rotation axis of the shaft. The rotation angle sensor can thus accurately detect the magnetic field of a magnet provided at the end of the shaft.

4 Claims, 11 Drawing Sheets

(56) References Cited

OTHER PUBLICATIONS

Hasegawa, Machine Translation of JP2008175090, Jul. 2008.*
Office Action (6 pages) dated Jan. 7, 2015 issued in corresponding Chinese Application No. 201310109712.2 and English translation (9 pages).
Office Action (1 page) dated Mar. 26, 2015 issued in corresponding Japanese Application No. 2012-076187 and English translation (2 pages).
Office Action (6 pages) dated Sep. 6, 2015, issued in corresponding Chinese Application No. 201310109712.2 and English translation (9 pages).

* cited by examiner

MOTOR DRIVE APPARATUS

CROSS REFERENCE TO RELATED APPLICATION

This application relates to and incorporates herein by reference Japanese patent application No. 2012-76187 filed on Mar. 29, 2012.

TECHNICAL FIELD

The present disclosure relates to a motor drive apparatus, in which a motor unit and a control unit are integrated.

BACKGROUND

A conventional electric power steering system (EPS) assists a steering operation of a driver by driving force of a motor.

An EPS disclosed in JP 2011-176998A (US 2011/0018374 A1) uses a motor drive apparatus, in which an electronic control unit is provided at one axial side of a motor in an axial direction of the motor. In this motor drive apparatus, a motor case housing the motor therein has a hole provided at axial one end thereof, which is on the control unit side, and a column is inserted from the motor side. A bolt is inserted into a thread hole provided in a heat sink, which forms the control unit, and thread-engaged with the column. Thus the heat sink is attached to the motor case. A rotation angle sensor is mounted on a control unit substrate attached to the motor side of the heat sink. The rotation angle sensor detects the magnetic field of a magnet attached to an axial end of a shaft of the motor and outputs its detection signal to a control circuit provided on the control unit substrate. The control circuit detects a rotational angle of a rotor based on the detection signal of the rotation angle sensor and controls driving of the motor.

According to the EPS described above, however, it is likely that the rotation angle sensor mounted on the control unit substrate deviates in position from the rotation axis of the shaft because of a gap between the hole of the motor case and the column or a gap between the thread hole of the heat sink and the bolt. When the relative position between the rotation angle sensor and the magnet deviates, the control circuit will possibly not be able to detect the rotation angle of the rotor accurately from the detection signal of the rotation angle sensor.

SUMMARY

It is therefore an object to provide a motor drive apparatus, which improves accuracy of a positional relation between a magnet provided on a shaft and a rotation angle sensor provide on a control unit substrate.

According to one aspect, a motor drive apparatus includes a control unit case on one axial end of a motor case in an axial direction. A positioning part is formed on a rear end frame, which supports a shaft, to determine a position of a control unit substrate relative to the rear end frame. A rotation angle sensor is mounted on the control unit substrate at a position on a rotation axis of the shaft. Since the shaft and the control unit substrate are thus positioned by the rear end frame, positioning accuracy between a magnet provided on the shaft and the rotation angle sensor mounted on the control unit substrate is improved. The rotation angle sensor thus detects the magnetic field of the magnet accurately. Since the rotation angle of a rotor is detected accurately, the motor drive apparatus can control driving a motor accurately.

BRIEF DESCRIPTION OF THE DRAWINGS

The above and other objects, features and advantages will be described with reference to the accompanying drawings. In the drawings.

EMBODIMENT OF THE INVENTION

First Embodiment

Figure 1:
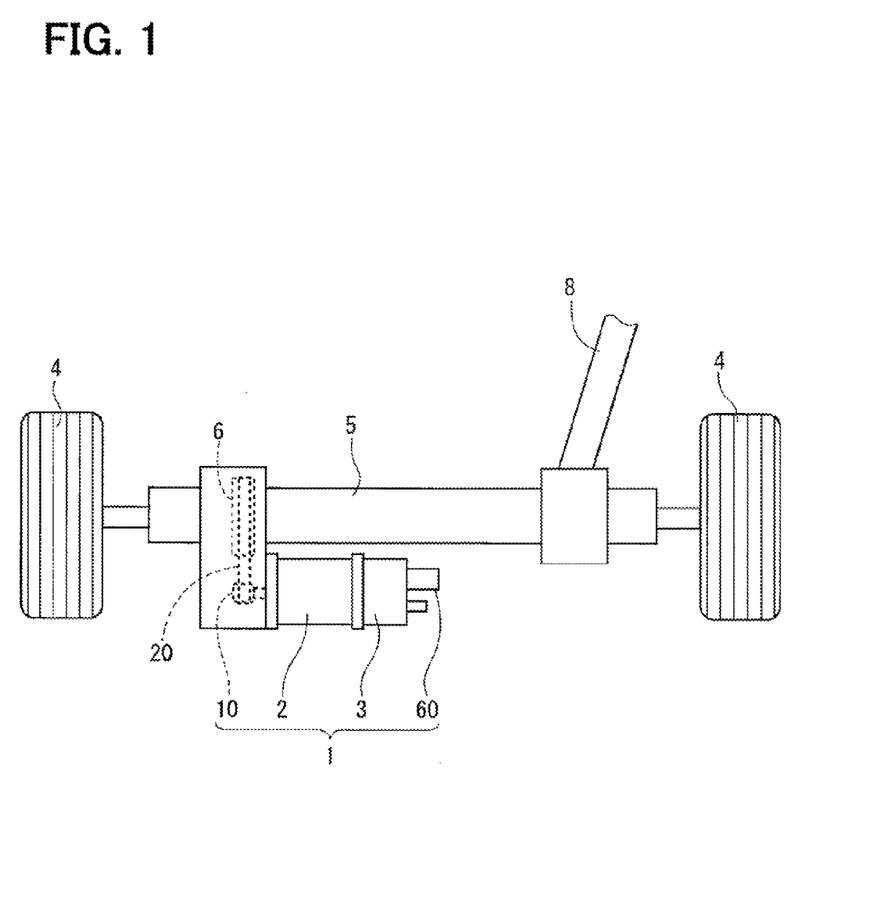
FIG. 1 is a schematic view of an electric power steering system, which uses a motor drive apparatus according to a first embodiment.
Figure 2:
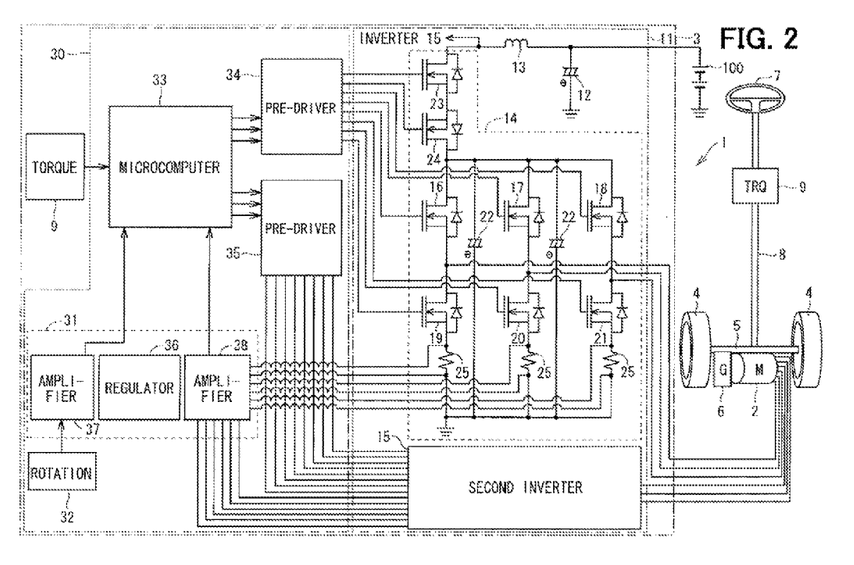
FIG. 2 is a circuit diagram of the motor drive apparatus according to the first embodiment.

Referring first to FIG. 1 and FIG. 2, a motor drive apparatus 1 is used in an electric power steering system (EPS), which assists a steering operation of a vehicle driver by driving force of a motor. The motor drive apparatus 1 includes a motor unit 2 and an electronic control unit 3. The motor drive apparatus 1 is attached to a rack 5, which connects left and right tire wheels 4, in an engine compartment. An output part 10 of the motor drive apparatus 1 and a reducer 6, which moves the rack 5 in the axial direction, are coupled by a belt 20. The output part 10 may be a gear.

When a steering wheel 7 is operated by a driver, a torque generated in a steering shaft 8 by the steering operation is detected by a torque sensor 9. The motor drive apparatus 1 generates a torque, which assists a steering operation, based on a detection signal outputted from the torque sensor 9, a vehicle speed signal transferred from a CAN (controller area network) and the like. When this torque is transferred from the output part 10 of the motor drive apparatus 1 to the reducer 6 via the belt 20, the reducer 6 moves the rack 5 in the axial direction.

The control unit 3 is electrically configured as shown in detail in FIG. 2.

The control unit 3 includes a power circuit 11 for supplying currents to drive the motor unit 2 and a control circuit 30 for controlling an operation of the power circuit 11. The power circuit 11 includes a first capacitor 12, a choke coil 13, plural switching elements 16 to 21, which form plural inverter circuits 14, 15, and second capacitors 22.

The power circuit 11 is supplied with electric power from a power source 100. The first capacitor 12 and the choke coil 13 of the power circuit 11 form a filter circuit. The choke coil 13 is connected in series between the power source 100 and power relays 23, 24 to attenuate variation of a voltage. The power circuit 11 includes first and second inverter circuits 14 and 15. Since the inverter 14 and the inverter 15 have substantially the same configuration, only the configuration of the inverter 14 will be described here. The power relays 23, 24 and the switching elements 16 to 21 are MOSFETs. A source-drain path of each MOSFET is controlled to turn on and off by a gate voltage applied thereto. The power relays 23, 24 are connected between the switching elements 16 to 21 and the choke coil 13 to shut off the currents, which flow to the motor unit 2 through the switching elements 16 to 21, upon occurrence of abnormality.

The three switching elements 16 to 18 on the power source side (high potential side) have drains, which are connected to the power source side, and sources, which are connected to drains of the three switching elements 19 to 21 on the ground side (low potential side) corresponding to the switching elements 16 to 18, respectively. The three switching elements 19 to 21 on the ground side have sources, which are grounded through respective shunt resistors 25. Junctions between the switching elements 16 to 18 and the switching elements 19 to 21, which correspond to the switching elements 16 to 18, are connected to a three-phase coil set (not shown) of the motor unit 2. The shunt resistors 25 are connected between the switching elements 19 to 21 and the ground. The currents, which flow to the motor unit 2, are detectable by detecting voltages or currents applied to the shunt resistors 25.

The second capacitors 22 are connected between a power source side conductor and a ground side conductor of the switching elements 16 to 21. Each second capacitor 22 is connected in parallel to each pair of series-connected switching elements, for example, switching elements 16 and 19. The second capacitors 22 supplement power supply to the switching elements 16 to 21 by storing charges therein and absorb ripple currents generated by switching of currents.

The control circuit 30 includes a customized integrated circuit (IC) 31 connected to the rotation angle sensor 32, a microcomputer 33, pre-drivers 34, 35 and the like. The customized IC 31 is a semiconductor circuit, which includes a regulator 36, a rotation angle sensor signal amplifier 37, a detection voltage amplifier 38 and the like. The regulator 36 is a stabilizer circuit for stabilizing electric power supplied from the power source 100. The microcomputer 33 operates with a predetermined voltage (for example, 5V) stabilized by the regulator 36. The signal outputted from the rotation angle sensor 32 is inputted to the rotation angle sensor signal amplifier 37. The rotation angle sensor 32 is a magnetic sensor, which is positioned in the magnetic field of the magnet attached to the shaft of the motor unit 2 and senses the surrounding magnetic field. The signal outputted from the rotation angle sensor 32 is applied to the rotation angle sensor signal amplifier 37 as a detection signal, which indicates a rotation angle of the rotor of the motor unit 2. The rotation angle sensor signal amplifier 37 amplifies the signal applied from the rotation angle sensor 32 and outputs an amplified signal to the microcomputer 33. The detection voltage amplifier 38 detects terminal voltages of the shunt resistors 25, amplifies detected voltages and outputs amplified voltages to the microcomputer 33.

The microcomputer 33 receives output signals of the rotation angle sensor signal amplifier 37, the detection voltage amplifier 38 and the torque sensor 9 as well as vehicle speed information of CAN. The microcomputer 33, receiving these signals, causes the pre-drivers 34 and 35 to generate pulse signals by PWM control to assist the steering operation of the steering wheel 7 based the rotation angle of the rotor variably in correspondence to the vehicle speed.

The pulse signals control on/off switching operations of the switching elements 16 to 21 of the two inverter circuits 14, 15. The microcomputer controls the inverter circuits 14 and 15 based on the signal of the detection voltage amplifier 38 to approximate the currents supplied to the motor unit 2 in a sine wave form. Thus, the motor unit 2 is supplied with currents of different phases and in the sine wave form and generates a rotating magnetic field by the coil set of the stator of the motor unit 2. The motor unit 2 generates a torque by the rotating magnetic field and assists the steering operation of the steering wheel 7 by a driver.

Figure 3:
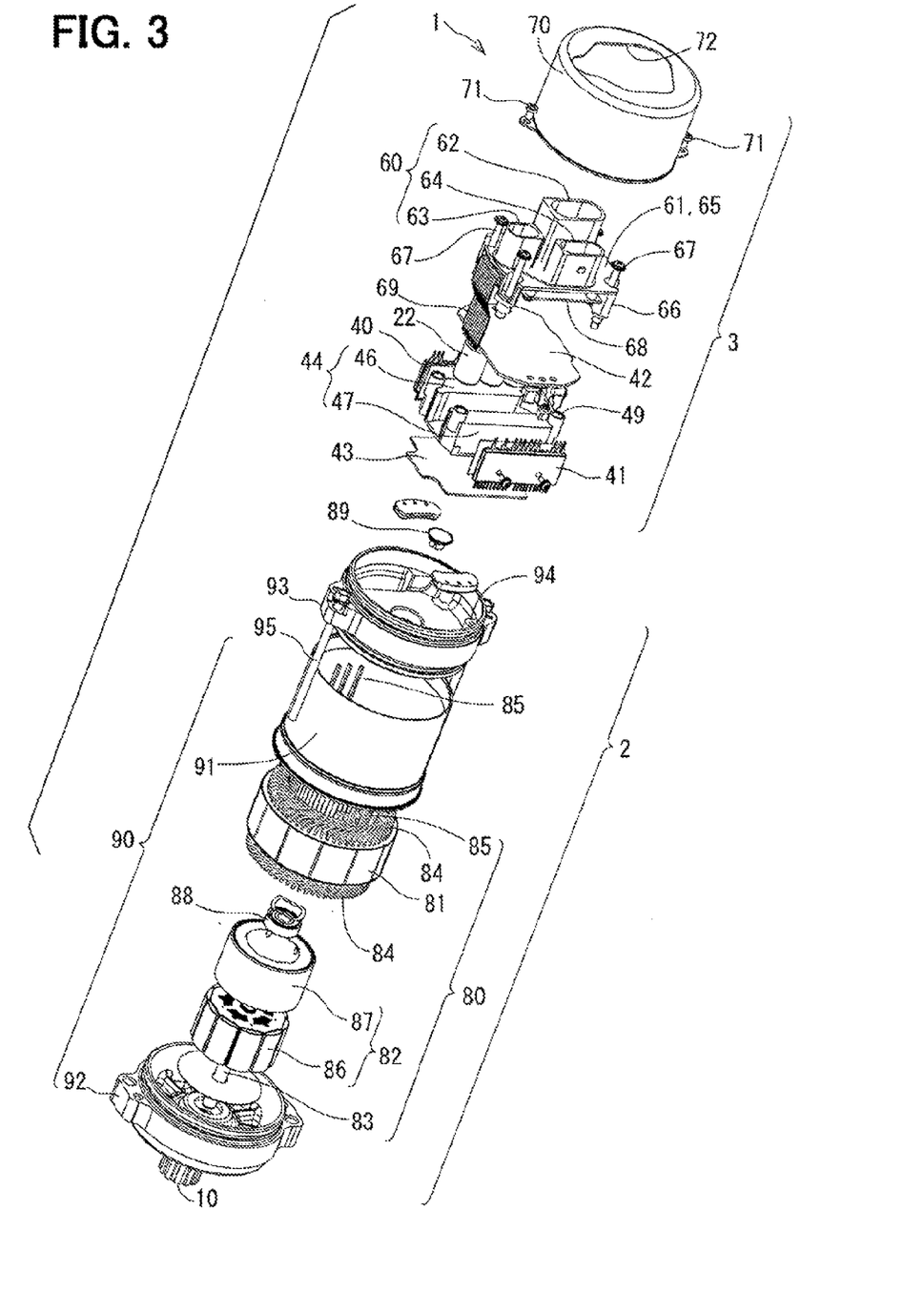
FIG. 3 is an exploded perspective view of the motor drive apparatus according to the first embodiment.
Figure 4:
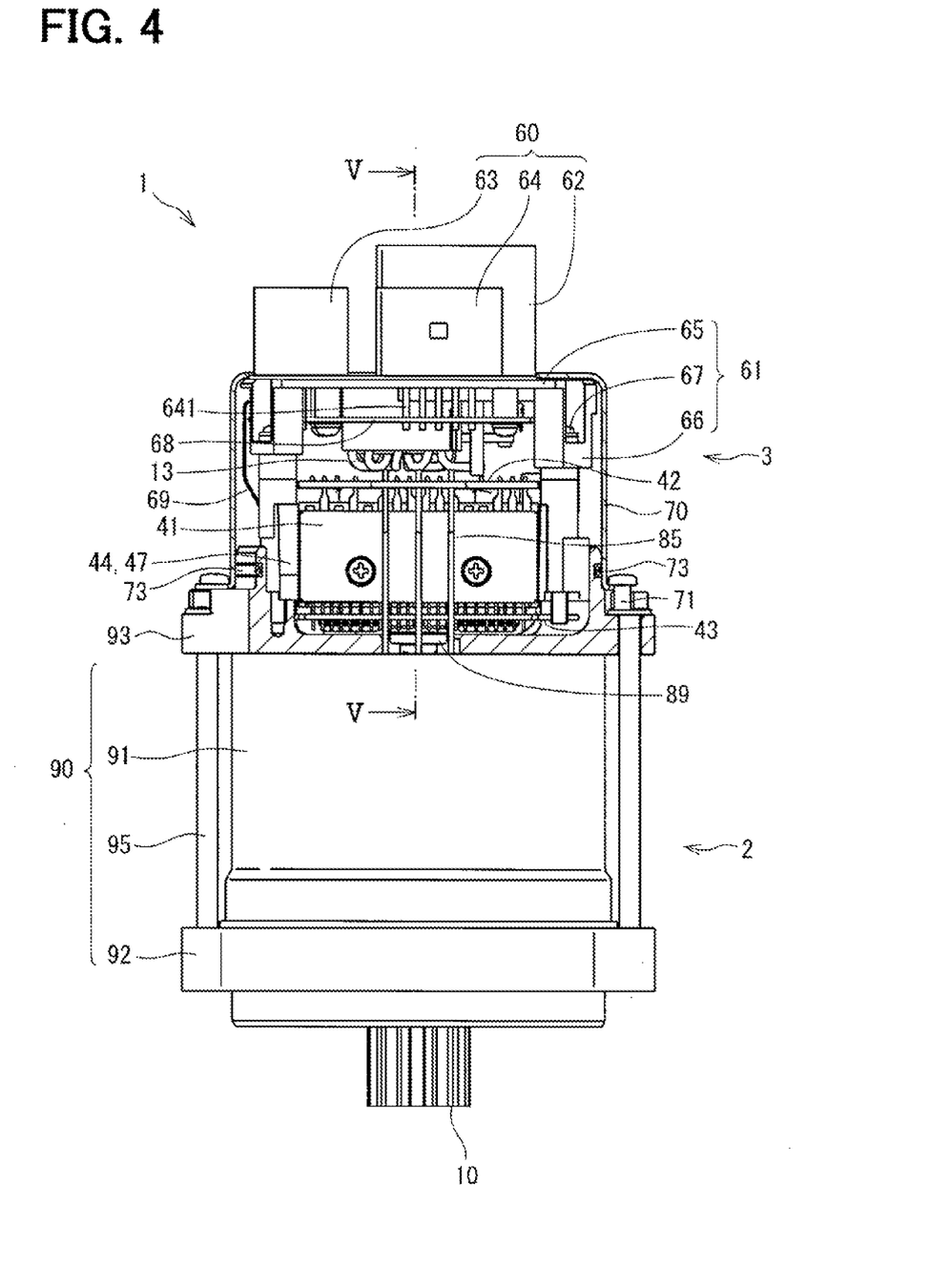
FIG. 4 is a side view, partly in section, of the motor drive apparatus according to the first embodiment.
Figure 5:
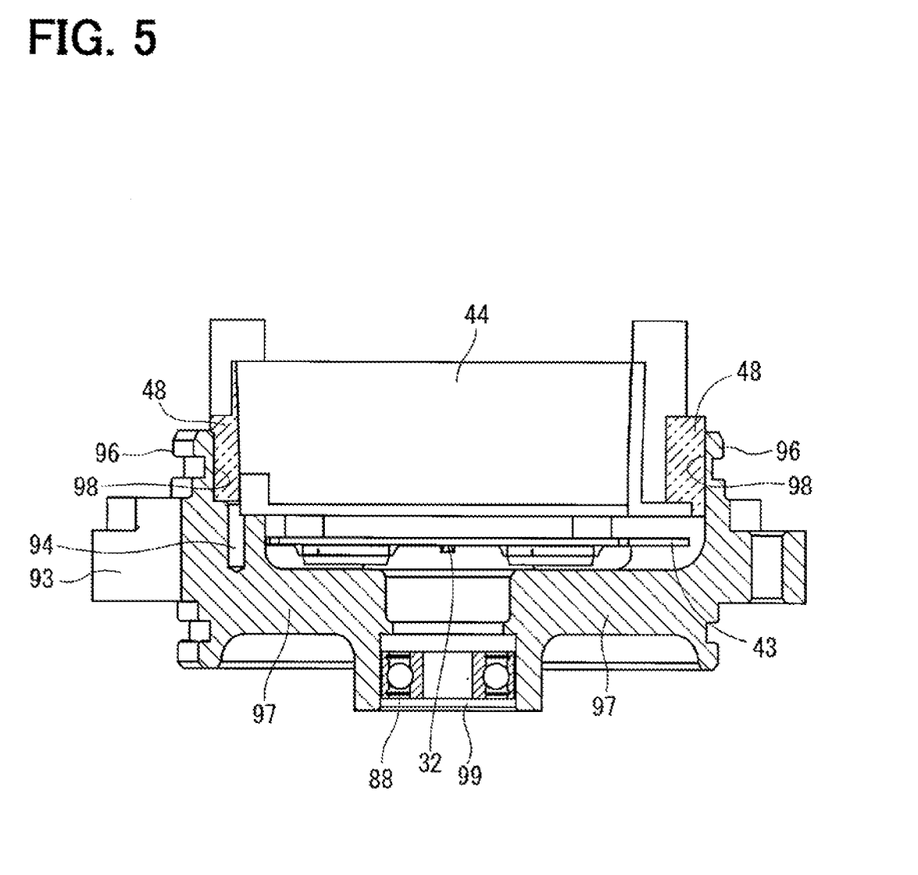
FIG. 5 is sectional view showing a main part, which includes a rear end frame, a heat sink, a control unit substrate and a bearing, of the motor drive apparatus according to the first embodiment.

The motor unit 2 is configured mechanically as shown in detail in FIG. 3 and FIG. 4.

The motor unit 2 includes a motor 80, a motor case 90 and the like. The motor 80 includes a stator 81, a rotor 82 and the shaft 83. The stator 81 has salient protrusions and slots, each of which is arranged alternately in a peripheral (circumferential) direction. A coil set 84 is accommodated in the slots of the stator 81. Windings of the coil set 84 are wound about the salient protrusions. The coil set 34 is formed of two three-phase coils. Motor terminals 85 led out from the coil set 84 extend toward the control unit 3 side and are connected to the power circuit substrate 42. The rotor 82 is provided radially inside the stator 81 to be rotatable relative to the stator 81. The rotor 82 includes a rotor core 86, on which opposite magnetic poles are alternately arranged in the peripheral direction, and a rotor case 87, which houses the rotor core 86 therein. The shaft 83 is fixed to the rotation axis (rotation center) of the rotor 82. The shaft 83 is supported rotatably at one axial end and the other axial end thereof. The one axial end is supported rotatably by a bearing (not shown) provided in a front end frame 92. The other axial end is supported rotatably by a bearing 88 provided in a rear end frame 93. The magnet 89 is attached to the shaft 83 at the axial end part, which is at the control unit substrate 43 side, to detect the rotation angle of the rotor 82. The magnet 89 has opposite polarities in the rotation direction to form a parallel magnetic field, in which magnetic fluxes flow in a direction perpendicular to the rotation axis of the shaft 83, which is the radially central axis of the shaft 83.

The motor case 90 is formed of a motor case body 91 of a cylindrical shape and a front end frame 92. The stator 81 is firmly fixed to the radially inside surface of the motor case body 91. The rear end frame 93 is provided at a side opposite to the front end frame 92 of the motor case body 91. The front end frame 92 and the rear end frame 93 are fixed to face each other in a manner to sandwich the motor case body 91 therebetween. An O-ring (not shown) is provided between the motor case body 91 and the front end frame 92. Another O-ring (not shown) is provided between the motor case body 91 and the rear end frame 93.

When the currents are supplied from the switching elements 16 to 21 to the coil set 84 of the stator 81 through the motor terminals 85, the rotating magnetic field is formed to rotate the rotor 82 relative to the stator 81 in a normal or reverse direction. The shaft 83 outputs the torque to the reducer 6 of the rack 5 from the output part 10 provided at the front end frame 92 side of the shaft 83 through the belt 20.

The control unit 3 is configured mechanically as shown in detail in FIG. 3 and FIG. 4.

The control unit 3 includes a heat sink 44, power modules 40, 41, the control unit substrate 43, the power circuit substrate 42 and the like. The control unit 3 is housed in a control unit case 70. The heat sink 44 is formed of a metal such as aluminum, which has a high thermal conductivity. The heat sink 44 is attached to the rear end frame 93 at an axial side, which is opposite to the output part 10. The heat sink 44 has two side walls 46, 47 provided symmetrically to sandwich the rotation axis of the motor 80. The power module 40 is attached to an outer wall surface of the side wall 46 and the power module 41 is attached to an outer wall surface of the side wall 47. The heat sink 44 is capable of absorbing heat generated by two power modules 40, 41.

The power module 40 is formed by molding the power relays 23, 24, the switching elements 16 to 21, the shunt resistors 25 and conductors connecting those circuit components, which form the first inverter circuit 14, by a molding material such as resin. The power module 41 is formed by molding the switching elements and the like, which form the second inverter circuit 15, by a molding material such as resin. The power module 40 and the power module 41 have substantially the same configuration.

The power circuit substrate 42 is attached to the heat sink 44 at an side opposite to the motor unit 2. The first capacitor 12, the choke coil 13, the second capacitors 22 and the like, which partly form the power circuit 11, are mounted on the power circuit substrate 42. The second capacitors 22 are located between the two side walls 46 and 47. Conductors are formed on the power circuit substrate 42 to supply the currents, which are supplied from the power source 100 of the vehicle through a connector 60, to the coil set 84 of the motor unit 2 through the switching elements 16 to 21 and the second capacitors 22 of the two power modules 40, 41.

The control unit substrate 43 is fixed to the motor unit 2 side of the heat sink 44 by screws or the like. The customized IC 31, the rotation angle sensor 32, the microcomputer 33, the pre-drivers 34, 35 and the like, which form the control circuit 30, are mounted on the control unit substrate 43. For example, the control circuit 30 is formed on a front surface (not shown) of the control unit substrate 43, that is, on a surface of the control unit substrate 43, on which the rotation angle sensor 32 is mounted in a manner to face the magnet 89. This control circuit 30 controls on/off switching of the switching elements 16 to 21 of the two power modules 40 and 41 as described above based on the signals supplied to the connector 60, the rotation angle of the rotor 82 detected by the rotation angle sensor 32 and the like. The connector 60 and a component carrier 61 are molded integrally by a resin and located at the opposite axial side of the output part 10 when viewed from the heat sink 44. The connector 60 includes a power connector, a sensor connector 63 and a signal connector 64. The power connector 62 is supplied with a current for driving the motor 80. The sensor connector 63 is supplied with the signals of the torque sensor 9 and the like. The signal connector 64 is supplied with the signals of the CAN and the like. The component carrier 61 includes a flat plate part 65 and four leg parts 66. The flat plate part 65 is formed in generally a rectangular shape which extends generally perpendicularly relative to the rotation axis of the motor 80. The four leg parts 66 extend toward the heat sink side from corner parts of the flat plate part 65. Bolts 67 are inserted in holes formed in the leg parts 66 in the axial direction of the leg parts 66. The bolts 67 are thread-engaged with female threads 94 of the rear end frame 93 through holes 49 of the heat sink 44 formed in the axial direction. Thus the component carrier 61, the heat sink 44 and the rear end frame 93 are fixed.

A control unit case 70 is formed in a bottomed cylindrical shape and houses therein the heat sink 44, the control unit substrate 43, the power circuit substrate 42, the component carrier 61 and the like. The control unit case 70 is fixed to the rear end frame 93 by screws 71. The control unit case 70 is press-fitted on the radially outer surface of a cylindrical wall 96 of the rear end frame 93. An O-ring 73 is provided between the control unit case 70 and the rear end frame 93. This O-ring 73 is an annular seal member. The control unit case 70 has a hole 72 at an axial side, which is opposite to the output part 10, to pass the connector 60 therethrough. The connector 60 extends through the hole 72 from the inside of the control unit case 70 in the axial direction opposite to the output part 10.

The component carrier 61 is provided with a connector substrate 68. The sensor connector 63 and terminals of the sensor connector 64 are connected to the connector substrate 68. The signals supplied to the sensor connector 63 and the signal connector 64 are sent from signal conductors 69 to the control circuit 30 of the control unit substrate 43 through the connector substrate 68.

Assembling structure of the rear end frame 93 and the heat sink 44 are shown in FIG. 5 to FIG. 9.

Figure 6:
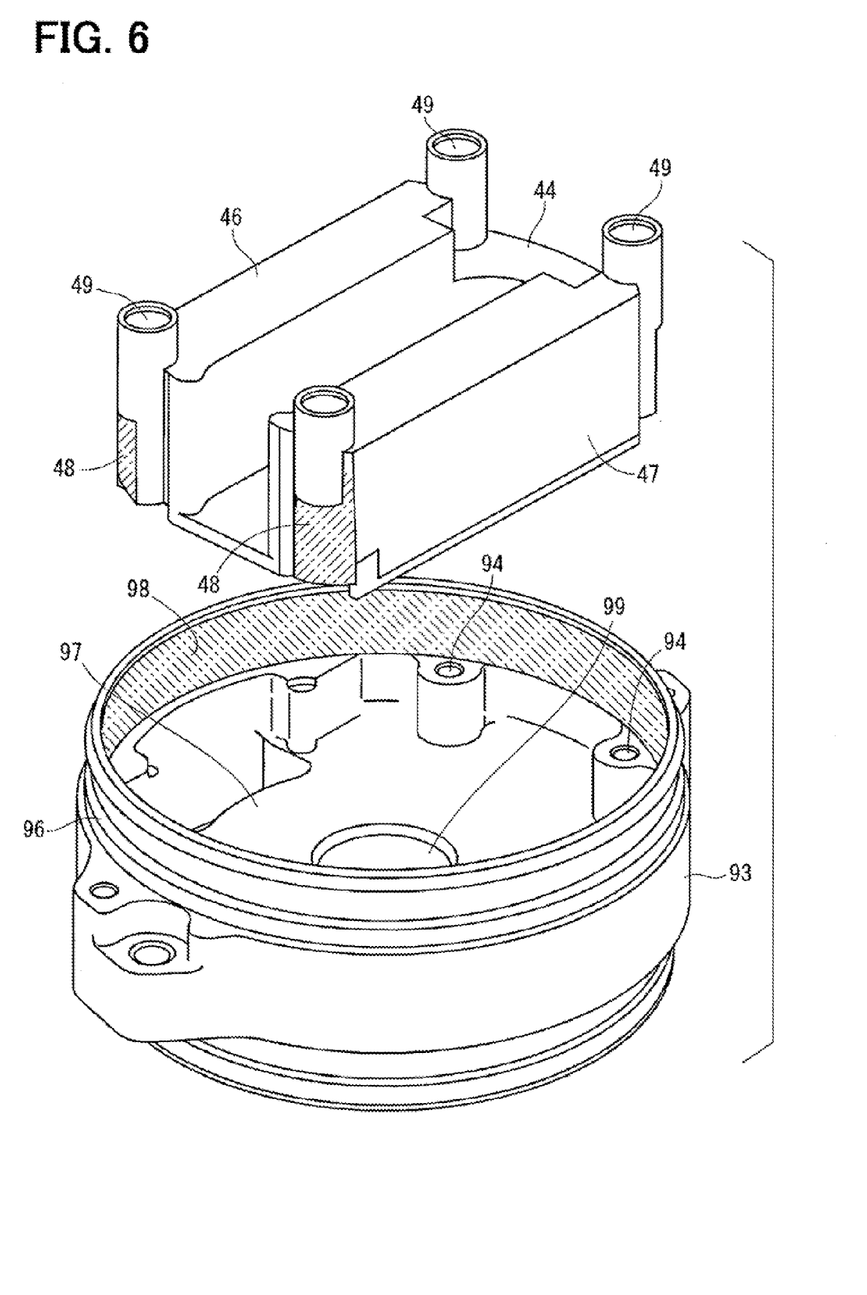
FIG. 6 is an exploded perspective view showing the rear end frame and the heat sink of the motor drive apparatus according to the first embodiment.
Figure 7:
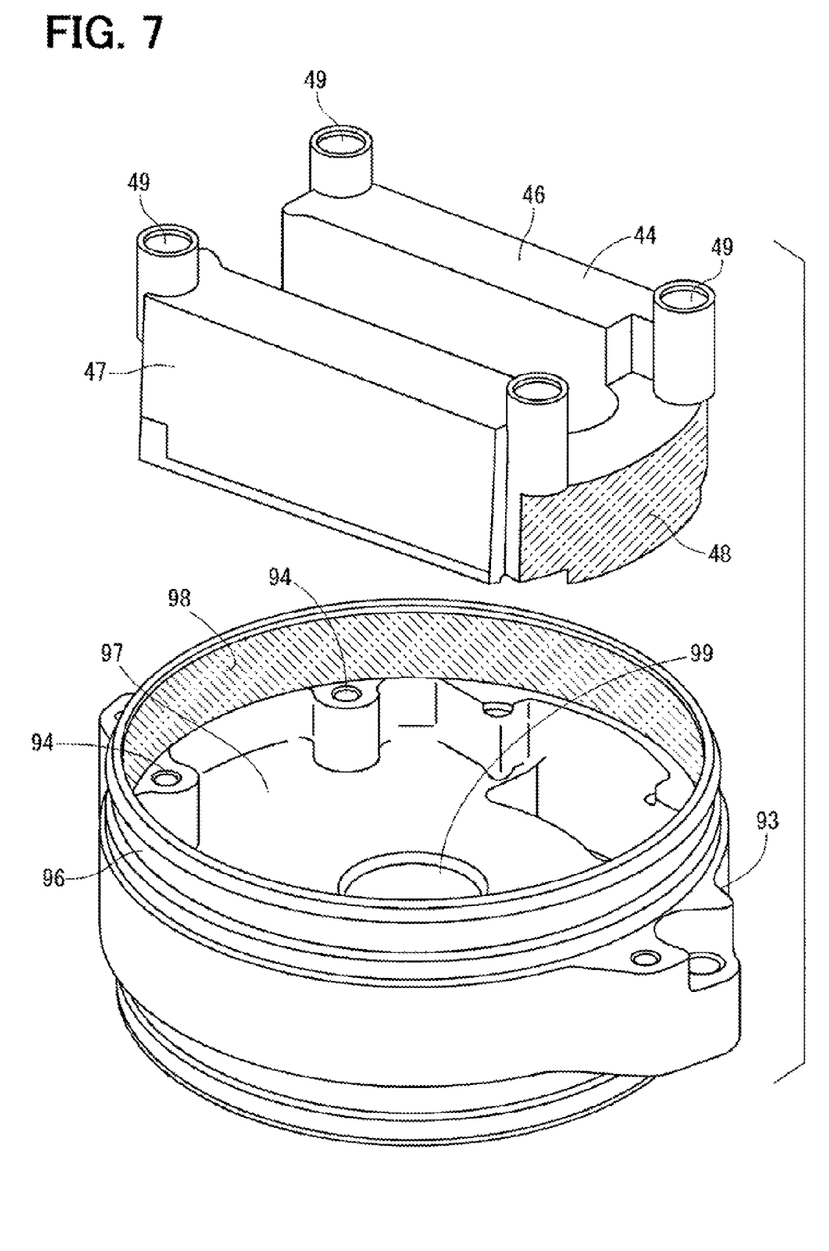
FIG. 7 is another exploded perspective view showing the rear end frame and the heat sink of the motor drive apparatus according to the first embodiment.
Figure 8:
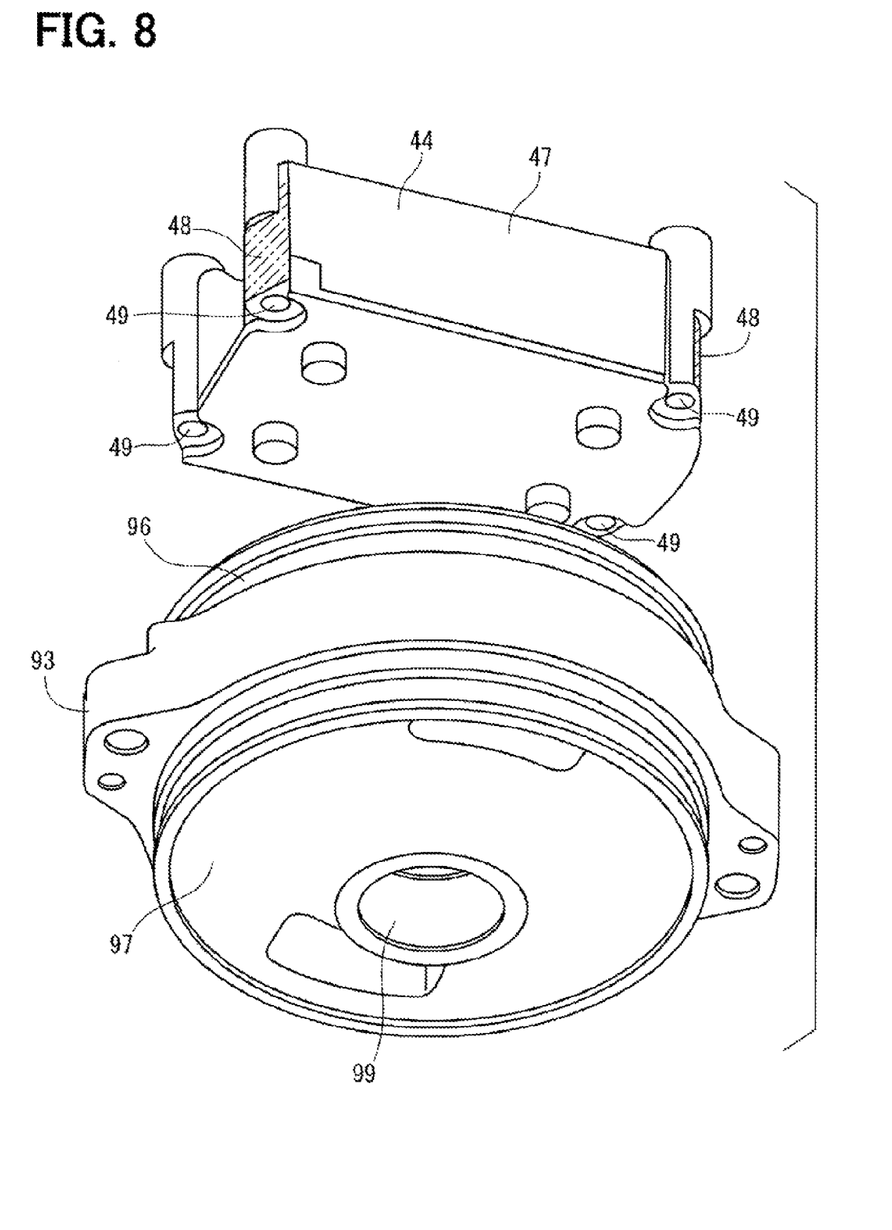
FIG. 8 is a further exploded perspective view showing the rear end frame and the heat sink of the motor drive apparatus according to the first embodiment.

The rear end frame 93 has a cylindrical wall 96 in a cylindrical shape and a partition wall 97. A first socket-spigot fitting surface 98 is formed, as an inside fitting surface, on a radially inside wall surface of the cylindrical wall 96 of the rear end frame 93. In FIG. 6 and FIG. 7, the first socket-spigot fitting surface 98 is indicated by hatching of one-dot chain lines. The first socket-spigot fitting surface 98 is shaped cylindrically about its radial center, which is on the rotation axis of the shaft 83. The rear end frame 93 has a shaft hole 99 in the partition wall 97 at a position, which corresponds to the shaft 83. A bearing 88 is fitted in the shaft hole 99. The shaft 83 is supported rotatably by the bearing 88. The first socket-spigot fitting surface 98 and the shaft hole 99 may be formed by, for example, rotating the rear end frame 93 and performing a cutting process. Thus the first socket-spigot fitting surface 98 and the shaft hole 99 are formed coaxially.

A second socket-spigot fitting surface 48 is formed, as an outside fitting surface, on the heat sink 44 at a position corresponding to the first socket-spigot fitting surface 98 of the rear end frame 93. In FIG. 5 to FIG. 8, the second socket-spigot fitting surface 48 is indicated by hatching of one-dot chain lines. The second socket-spigot fitting surface 48 is formed arcuately about its radial center, which is on the rotation axis of the shaft 83. The radius of the first socket-spigot fitting surface 98 is equal to or slightly greater than a radius of curvature of the second socket-spigot fitting surface 48. Thus the first socket-spigot fitting surface 98 and the second socket-spigot fitting surface 48 can be fitted tightly.

Figure 9:
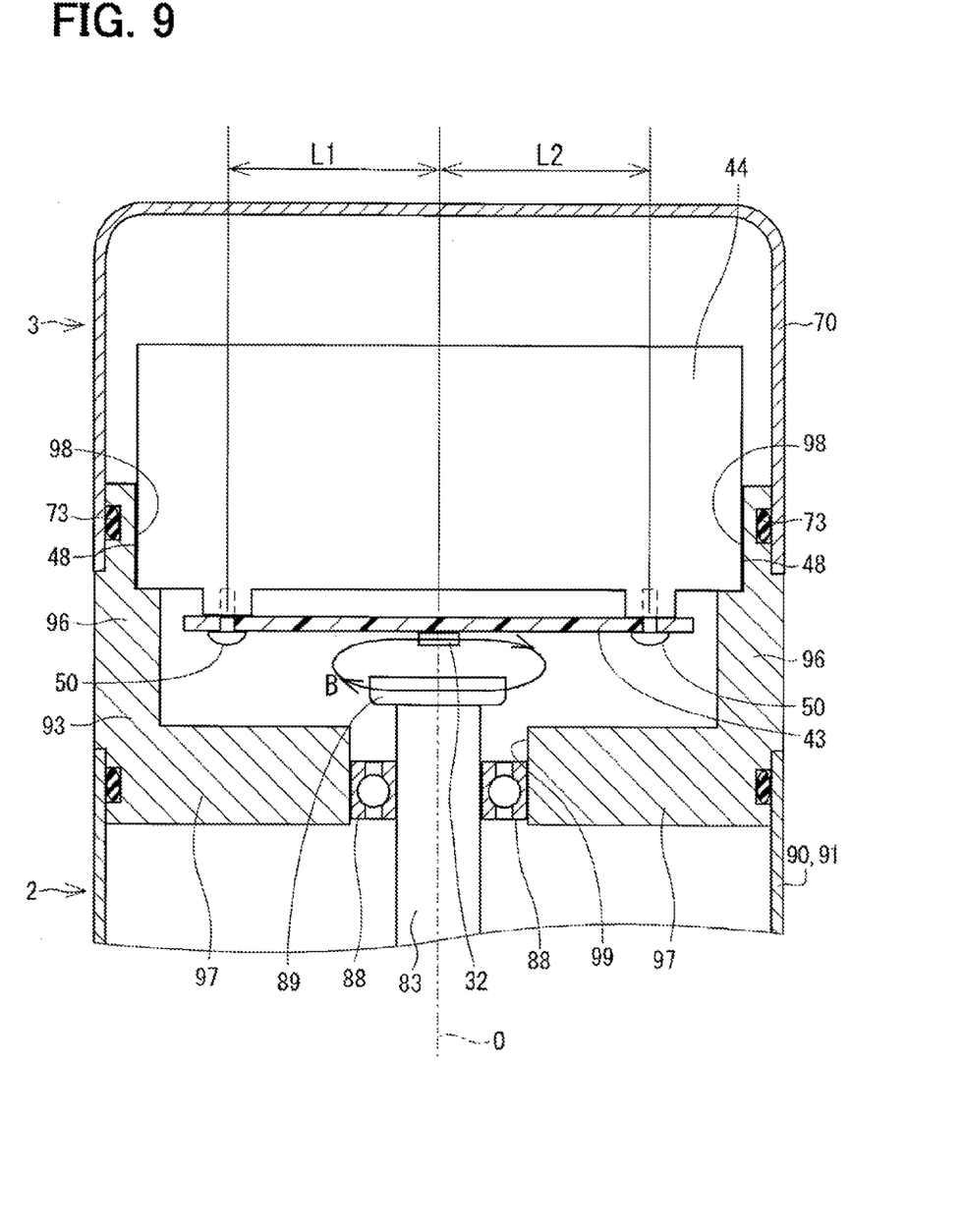
FIG. 9 is a schematic sectional view of the motor drive apparatus according to the first embodiment.

As shown in FIG. 9, the control unit substrate 43 is attached to the partition wall side of the heat sink 44 by plural screws 50. The screws 50 are fixing members, which fix the control unit substrate 43 to the heat sink 44 and in the end relative to the rear end frame 93. A distance L1 between one screw 50 and the rotation angle sensor 32 and a distance L2 between the other screw 50 and the rotation angle sensor 32 are equal. That is, the screws 50 are provided symmetrically relative to the rotation axis of the shaft 83. The rear end frame 93 supports the shaft 83 rotatably via the bearing 88 and positions the control unit substrate 43 via the heat sink 44. By the fitting of the first socket-spigot fitting surface 98 and the second socket-spigot fitting surface 48, the control unit substrate 43 is located in position accurately relative to the rear end frame 93. As a result, the rotation angle sensor 32 mounted on the control unit substrate 43 is located on the rotation axis of the shaft 83, that is, right above the magnet 89. The magnet 89 provides a parallel magnetic field, in which magnetic fluxes flow in a perpendicular direction relative to the rotation axis of the shaft 83. In FIG. 9, the magnetic field of the magnet 89 is indicated by an arrow B schematically. The rotation angle sensor 32 outputs the voltage signal corresponding to a magnetic flux density of the magnetic field passing through its magnetic sensing surface area. The microcomputer 33 provided in the control circuit 30 detects the rotation angle of the rotor 82 based on the output signal of the rotation angle sensor 32 and controls and drives the motor 80.

The present embodiment provides the following functions and advantages.

(1) Since the rear end frame 93 places the control unit substrate 43 in position through the heat sink 44, the rotation angle sensor 32 is provided on the rotation axis of the shaft 83. Thus, the accuracy of positioning the rotation angle sensor 32 and the magnet provided on the shaft 83 can be improved. Since the rotation angle of the rotor 82 can be detected accurately, the motor 80 can be controlled to be driven accurately.

(2) The first socket-spigot fitting surface 98 of the rear end frame 93 and the second socket-spigot fitting surface 48 are coaxial and firmly fitted. Thus the relative position of the rear end frame 93 and the heat sink 44 is determined. Since the control unit substrate 43 is attached to the heat sink 44, positioning accuracy between the magnet 89 provided on the axial end of the shaft 83 and the rotation angle sensor 32 on the control unit substrate 43 can be improved.

(3) The first socket-spigot fitting surface 98 is cylindrical about the rotation axis of the shaft 83. Thus the first socket-spigot fitting surface 98 and the shaft hoe 99 can be formed coaxially by performing the cutting process while rotating the rear end frame 93, for example.

(4) The distance L1 of the one screw 50 for fixing the control unit substrate 43 from the rotation angle sensor 32 and the distance L2 of the other screw 50 from the rotation angle sensor 32 are equal. Even when the control unit substrate 43 expands thermally, the rotation angle sensor 32 is suppressed from inclining. As a result, the rotation angle sensor 32 is held in parallel relative to an imaginary plane, which is perpendicular to the rotation axis of the shaft 83. Since the magnet 89 forms the magnetic filed, in which the magnetic fluxes flow, in parallel relative to the imaginary plane, the accuracy of the rotation position detection operation of the rotation angle sensor 32 can be expected.

(5) The O-ring 73 is provided between the control unit case 70 and the rear end frame 93. Thus, the O-ring 73 protects the control unit 3 from water or foreign articles entering through a clearance between the control unit case 70 and the rear end frame 93. It is thus possible to mount the motor drive apparatus 1 in the engine compartment of the vehicle.

Second Embodiment

Figure 10:
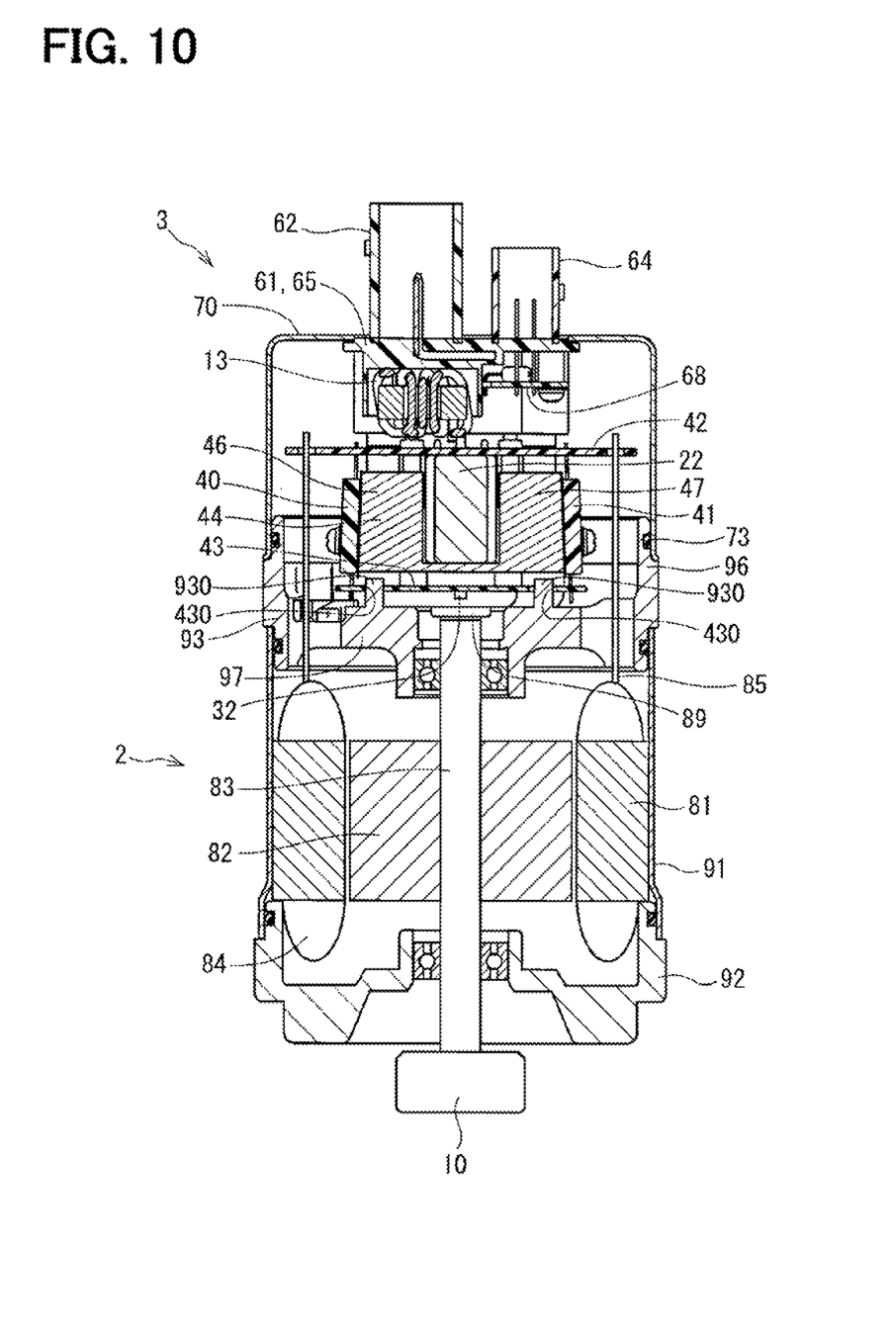
FIG. 10 is a schematic sectional view of a motor drive apparatus according to a second embodiment.

A second embodiment of a drive apparatus 1 is shown in FIG. 10. Substantially the same configuration as the first embodiment is indicated by the same reference numerals to thereby simplify the description.

In the second embodiment, at least two protrusions 930 are formed on the rear end frame 93 to extend from the partition wall 97 toward the control unit substrate 43 side. The protrusions 930 are fitted in at least two grooves 430 provided on the control unit substrate 43. An outer diameter of the protrusion 930 is equal to or slightly less than an inner diameter of the groove 430. Thus, the protrusions 930 of the rear end frame 93 and the grooves 430 of the control unit substrate 43 are fitted tightly in a socket-spigot manner. In the second embodiment, by fitting the protrusions 930 of the rear end frame 93 into the grooves 430 of the control unit substrate 43, the relative position between the rear end frame 93 and the control unit substrate 43 is determined. Thus, positioning accuracy between the magnet 89 provided on the shaft 83 and the rotation angle sensor 32 mounted on the control unit substrate 43 can be improved.

Third Embodiment

Figure 11:
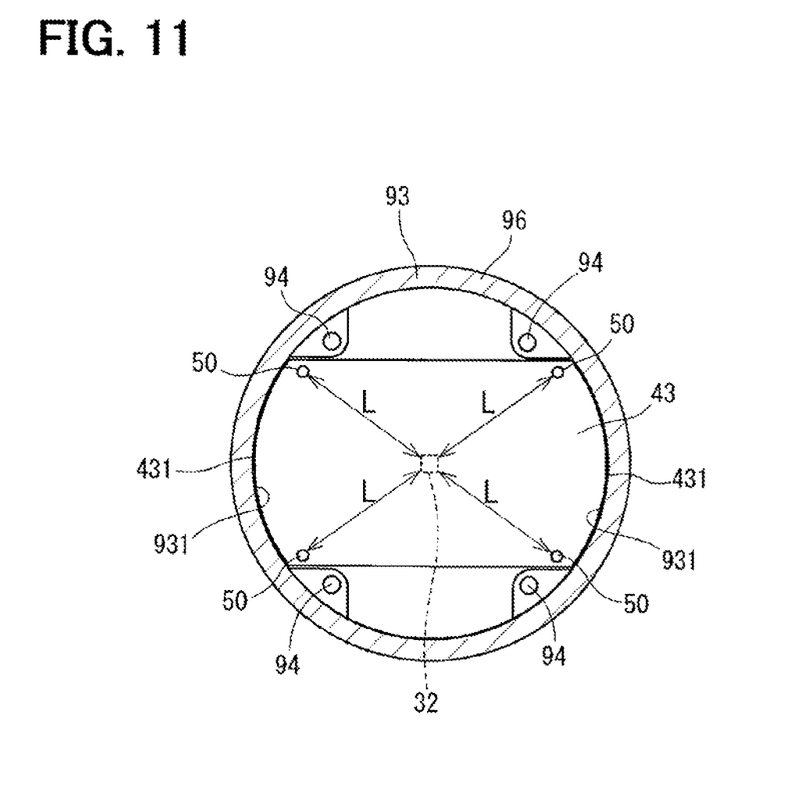
FIG. 11 is a schematic view showing a rear end frame and a control unit substrate of a motor drive apparatus according to a third embodiment.

A third embodiment of the motor drive apparatus is shown in FIG. 11.

FIG. 11 is a schematic view showing only the rear end frame 93 and the control unit substrate 43, when viewed in the axial direction of the shaft 83. In the third embodiment, a third socket-spigot fitting surface 931 is formed, as the inside fitting surface, on a radially inside wall surface of the cylindrical wall 96 of the rear end frame 93. The third socket-spigot fitting surface 931 is formed cylindrically with its center on the rotation axis of the shaft 83. A fourth socket-spigot fitting surface 431 is formed, as the outside fitting surface, on the control unit substrate 43 to correspond to the third socket-spigot fitting surface 931 of the rear end frame 93. The fourth socket-spigot fitting surface 431 is formed in an arcuate shape with its radial center on the rotation axis of the shaft 83. The radius of the third socket-spigot fitting surface 931 is equal to or slightly greater than the radius of curvature of the fourth socket-spigot fitting surface 431. Thus, the third socket-spigot fitting surface 931 and the fourth socket-spigot fitting surface 431 can be fitted tightly in a socket-spigot manner. Thus, the third socket-spigot fitting surface 931 and the fourth socket-spigot fitting surface 431 perform the similar function as the first socket-spigot fitting surface 98 and the second socket-spigot fitting surface 48 in the first embodiment.

In also the third embodiment, a distance L between each of the screws 50, which fix the control unit substrate 43 and the heat sink 44, and the rotation angle sensor 32 is equal to a distance L between the other screw 50 and the rotation angle sensor 32. As a result, even when the control unit substrate 43 thermally expands, the rotation angle sensor 32 is restricted from inclining and the rotation angle sensor 32 is held in parallel with the imaginary plane, which is perpendicular to the rotation axis of the shaft 83. The control unit substrate 43 may be attached to the rear end frame 93 by screws.

In the third embodiment, by fitting the third socket-spigot fitting surface 931 (corresponding to the first socket-spigot fitting surface 98) of the rear end frame 93 and the fourth socket-spigot fitting surface 431 of the control substrate 43 (corresponding to the second socket-spigot fitting surface 48 of the heat sink 44) tightly, the relative position of the rear end frame 93 and the control unit substrate 43 is determined. Thus, positioning accuracy between the magnet 89 provided on the axial end of the shaft 83 and the rotation angle sensor 32 mounted on the control unit substrate 43 can be improved. In the third embodiment, the third socket-spigot fitting surface 931 is formed cylindrically with its center on the rotation axis of the shaft 83. For this reason, the third socket-spigot fitting surface 931 and the shaft hole 99 can be formed coaxially by, for example, performing the cutting process while rotation the rear end frame 93.

Other Embodiment

The foregoing embodiments are described with respect to the motor drive apparatus 1, which is attached to the rack 5 of the vehicle. As the other embodiment, the motor drive apparatus 1 may be attached to a column shaft of the vehicle. In the foregoing embodiments, the first socket-spigot fitting surface or the third socket-spigot fitting surface of the rear end frame is formed by cutting. As the other embodiment, the first socket-spigot fitting surface 98 or the third socket-spigot fitting surface 931 may be formed by various machining processes such as grinding, casting or forging. The cylindrical or arcuate fitting surfaces 48, 98,431 and 981 may be formed to provide other fitting relation than the socket-spigot fitting relation as far as an inside fitting surface and an outside fitting surfaces are press-fitted to each other.

The motor drive apparatus described above may be implemented in various different embodiments, which may include combinations the plural embodiments.

What is claimed is:

1. A motor drive apparatus comprising:
    a motor including a motor case of a cylindrical shape, a stator housed inside the motor case, a rotor provided rotatably relative to the stator, and a shaft provided on a rotation axis of the rotor;
    a control unit case provided at one axial side of the motor case in an axial direction;
    a control unit substrate housed in the control unit case and including a control circuit to control currents supplied to the motor;
    a rear end frame provided between the motor case and the control unit case;
    a bearing fixed to the rear end frame to support rotatably one end of the shaft;
    a magnet provided at one axial end of the shaft extending from the bearing toward the control unit substrate, the magnet having different magnetic poles in a rotation direction;
    a rotation angle sensor provided on the control unit substrate to output a detection signal of a magnetic field of the magnet;
    a positioning part formed on the rear end frame to fixedly place the control unit substrate in position thereby to provide the rotation angle sensor on the rotation axis of the shaft; and
    a heat sink attached to the control unit substrate, wherein:
    the positioning part includes an inside fitting surface formed on a radially inside wall surface of the rear end frame;
    the heat sink includes an outside fitting surface, which is fitted with the inside fitting surface;
    the inside fitting surface and the outside fitting surface are formed in an arcuate shape or a cylindrical shape having a radial center on the rotation axis of the shaft;
    the inside fitting surface is formed of a single cylindrical surface that is continuous over a whole inner circumference of the inside wall surface of the rear end frame;
    the outside fitting surface is formed of plural arcuate surfaces; and
    the inside fitting surface and the outside fitting surface are both socket-spigot fitting surfaces to be fitted tightly.

2. The motor drive apparatus according to claim 1, wherein:
    the rear end frame has a shaft hole, in which the bearing is fitted; and
    the inside fitting surface of the rear end frame and the shaft hole are coaxial.

3. The motor drive apparatus according to claim 1, further comprising:
    plural fixing members for fixing the control unit substrate relative to the rear end frame,
    wherein a distance between one of the fixing members and the rotation angle sensor and a distance between another of the fixing members and the rotation angle sensor are equal to each other, and
    wherein the plural fixing members are arranged symmetrically such that one pair of the plural fixing members are positioned in one diagonal direction through the rotation angle sensor and another pair of the plural fixing members are positioned in another diagonal direction through the rotation angle sensor diagonally.

4. The motor drive apparatus according to claim 1, further comprising:
    a seal member of an annular shape,
    wherein the control unit case is fitted with a radially outside surface of the rear end frame with the seal member interposed between the control unit case and the rear end frame.

* * * * *